(12) United States Patent
Powers et al.

(10) Patent No.: US 6,460,103 B1
(45) Date of Patent: Oct. 1, 2002

(54) METHOD AND APPARATUS FOR RAPIDLY RESPONDING TO ROUTINE SOFTWARE REQUESTS

(75) Inventors: Daniel J. Powers, Spring, TX (US); Henry M. D'Souza, Cypress, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/290,281

(22) Filed: Apr. 13, 1999

(51) Int. Cl.7 .............................................. G06F 13/14
(52) U.S. Cl. ...................................................... 710/129
(58) Field of Search ......................... 710/129; 709/225; 345/334, 317

(56) References Cited

U.S. PATENT DOCUMENTS

| | | | | |
|---|---|---|---|---|
| 5,021,973 A | * | 6/1991 | Hernandez et al. | 707/504 |
| 5,600,313 A | * | 2/1997 | Freedman | 341/22 |
| 5,854,624 A | * | 12/1998 | Grant | 345/169 |
| 5,900,867 A | * | 5/1999 | Schindler et al. | 345/327 |
| 5,905,493 A | * | 5/1999 | Belzer et al. | 345/334 |
| 6,047,196 A | * | 4/2000 | Makela et al. | 455/556 |

OTHER PUBLICATIONS

Darwin keyboards Ltd, "Darwin keyboards introduces Launchboard software 20" PR Netwire, Jun. 11, 1997, 7 Pages.*

* cited by examiner

Primary Examiner—Jeffrey Gaffin
Assistant Examiner—Abdelmoniem I Elamin
(74) Attorney, Agent, or Firm—Sharp, Comfort & Merrett, P.C.

(57) ABSTRACT

A input device, such as a keyboard, having an array of unique rapid response keys for responding rapidly and conveniently to routine requests from software applications. Such routine requests include those requiring a "yes," "no" or "cancel" response. Other routine tasks includes saving and closing files, which typically causes software to issue a save request. Instead of responding to such requests with input from a pointing device, the unique rapid response keys allow a user to respond to such routine requests without removing her hands from the keyboard. Four dedicated keys are preferably located above an escape key on the keyboard. A device driver receives scan codes from the keyboard and translates the scan codes corresponding to the response keys for providing a properly formatted response to the requesting software application.

36 Claims, 7 Drawing Sheets

METHOD AND APPARATUS FOR RAPIDLY RESPONDING TO ROUTINE SOFTWARE REQUESTS

BACKGROUND OF THE INVENTION

1. Field of the Invention

The present invention relates generally to the field of computer systems having a graphical user interface, such as Windows™. More particularly, the invention relates to an input device, such as a keyboard, having unique keys to respond to routine software queries normally satisfied with a mouse click by selecting a "yes," "no," or "cancel" screen button.

2. Description of Related Art

With the advancement of graphical computer operating systems (OS) such as Microsoft® Windows™ and Apple® MacOS™, came the instant adoption of a pointing device as a standard means of communicating with the computer system. Pointing devices, such as a mouse, trackball, touchpad, and pointing stick provide computer users an easy mechanism to position a cursor anywhere on the screen. Generally, pointing devices also include at least one general-purpose electro-mechanical key to select on-screen "virtual" buttons placed there by the requesting OS or application (hereinafter application). This methodology provides an excellent way of presenting information to users and receiving command and control feedback from the user.

However, sometimes the graphical environment can be an obstacle to efficiency. Sometimes the application will request input that requires the user to type in a filename or such, but more routinely the application simply requests a "yes," "no," or "cancel" response. This can often get in the way of efficiency or lead to an unpleasant experience.

For example, users performing word processing functions are often most efficient if all computer interaction can be performed from the keyboard. Inefficiencies are introduced when the user is forced to move her hand from the keyboard to the pointing device to provide feedback to the computer. Furthermore, the task of constantly moving from keyboard to mouse to keyboard can be annoying and tiresome.

Not being unaware of this problem, software manufacturers have sometimes designed their applications to provide a built-in mechanism using standard keys to easily respond to a routine request. For example, if "yes," "no," and "cancel" buttons are placed on the screen for the user to respond to, the application may allow a "yes" response to be indicated by pressing the "Y" or "ALT-Y" key on the keyboard. Unfortunately, this method is not universally accepted by all software. Other applications may require the user to press the TAB key until the "yes" button is focused. When in focus, pressing the ENTER key will indicate a "yes" response. Yet other applications may provide no keyboard alternative at all. Thus, no consistent method or mechanism exists. Furthermore, even though software sometimes provides an easy way for users to respond to routine input requests, users are often unaware of the keyboard alternative.

Keys have been added to keyboards for other purposes. One such example is found in copending U.S. patent application Ser. No. 09/093,246, entitled "Rapid Network Access Computer System," filed Jun. 8, 1998 where there is described a system, including a keyboard or similar input device, providing dedicated keys or sensors for launching specific software applications and logging onto specific sites in a network.

There is a need, therefore, for an improved technique for responding to routine software requests in a computer system, particularly applications requesting a "yes," "no," or "cancel" response. There is a particular need for a simple and straightforward, user-friendly system for rapidly responding to such applications, without the need to move ones hand from the keyboard to the pointing device and back again.

SUMMARY OF THE INVENTION

The preferred embodiment of the present invention includes an input device for a computer system comprising one or more general-purpose keys and at least one unique response key. Each unique key corresponds to specific user feedback in response to a query from software. Each unique key provides a unique signal when activated, which is communicated to the computer system by a device driver for receipt by the software. The unique keys correspond to responses to routine software requests that may require a "yes," "no," or "cancel" response from the user. A "close-and-save" key is also provided to avoid the "yes," "no," or "cancel" query when closing a file that has not been saved. In one embodiment, the input device is a keyboard with the one or more general-purpose keys being a matrix of keys and the unique keys being positioned in a location easily accessible with respect to the matrix of keys.

In another variation, the present invention includes a computer system having a processor for executing a software application, an input/output controller and an input device coupled to the input/output controller. The input device includes one or more general-purpose keys and at least one unique response key. Each unique key corresponds to a predetermined answer in response to a query from a software application. Each unique key provides a unique signal when activated, which is communicated to the computer system by a device driver for receipt by the software application. The unique keys correspond to responses to routine software requests that may require a "yes," "no," or "cancel" response from the user. A "close-and-save" key is also provided to avoid the "yes," "no," or "cancel" query when closing a file that has not been saved. In one embodiment, the input device is a keyboard with the one or more general-purpose keys being a matrix of keys and the unique keys being positioned in a location easily accessible with respect to the matrix of keys. The software may be running under a windows operating system where the queries from software are presented in the form of a dialog box on a monitor. The computer system may also include a hard disk drive for storing the driver and software application.

The present invention may also include a method for rapidly responding to routine software request. Such method may include the steps of: actuating a unique rapid response key on a keyboard in response to a software request; translating the actuation into a scan code; providing the scan code to a central processing unit; the central processing unit determining whether the scan code is a unique rapid response key, including a CLOSE-AND-SAVE key; translating the scan code into a pre-determined response acceptable by the software; communicating the response to the software; and the software saving a file and closing the file, if the response corresponds to the CLOSE-AND-SAVE key. The unique keys may also correspond to responses to routine software requests that require a "yes," "no," or "cancel" response from the user. The routine software requests may be presented to the user in the form of a dialog box on a monitor, and the dialog box may be closed in response to receipt of the pre-determined response.

The present invention may also include a keyboard having a housing, a matrix of general-purpose keys, and at least one unique response key. Each unique key corresponds to a predetermined answer in response to a query from software. Each unique key provides a unique signal when activated. One of the unique response keys may be a CLOSE-AND-SAVE key for causing a software application operating on the computer system to save a file and close the file. Other keys may correspond to "yes," "no," or "cancel" responses. The keyboard also includes a device driver for operation on the computer system. The driver is responsive to the unique signal to communicate the specific user feedback to the software application. One of the general-purpose keys may be an escape key with the unique keys positioned above the escape key. One of the general-purpose keys may be a space bar with the unique keys positioned below the space bar.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1:
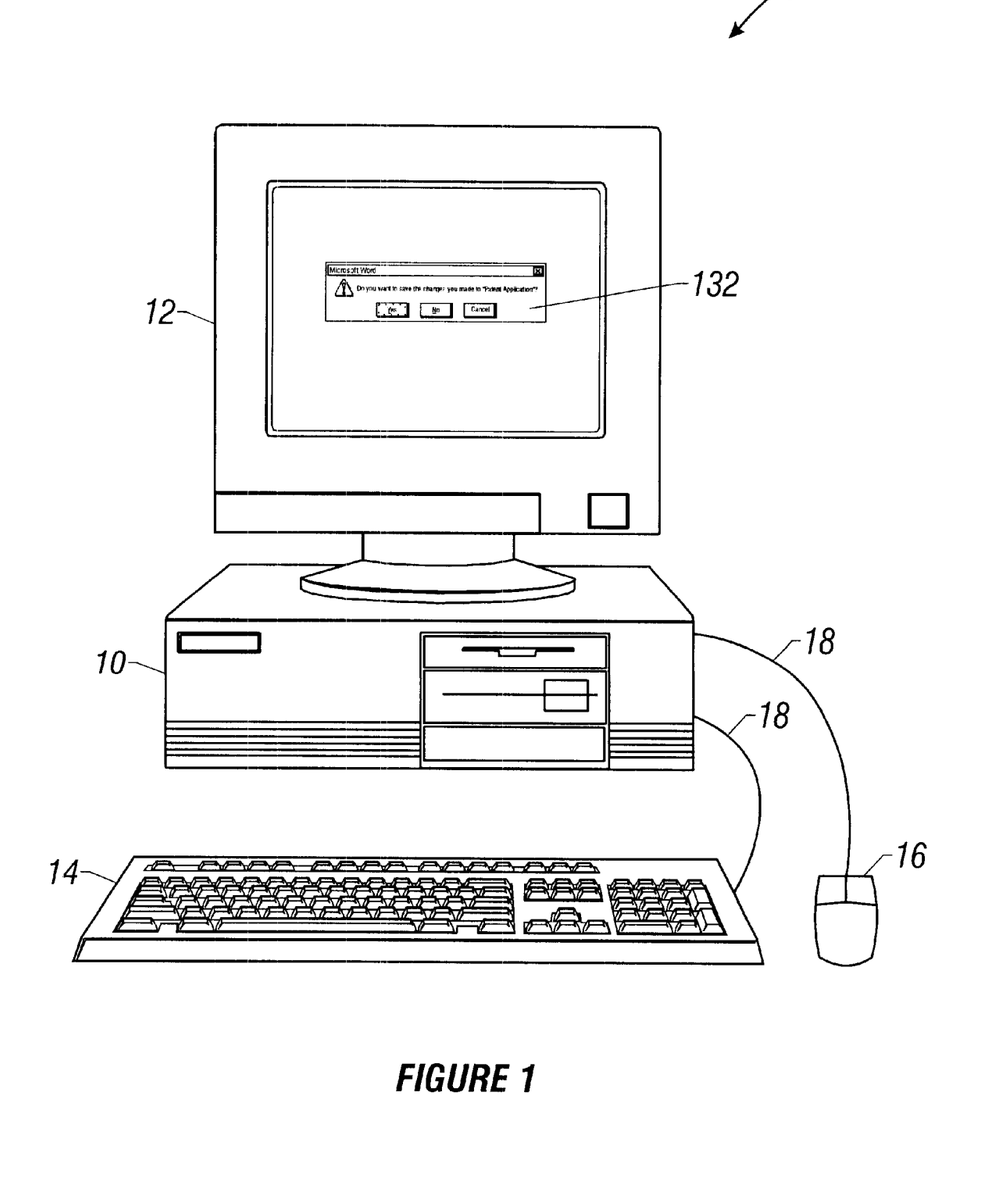
FIG. 1 is a diagrammatical representation of a computer system according to the preferred embodiment.

Referring first to FIG. 1, there is illustrated a computer system S, for example a personal computer (or "PC") according to the preferred embodiment. While the computer system S shown is of an International Business Machines ("IBM") PC variety operating Windows software, the principles of the present invention are equally applicable to other computer platforms or architectures, such as those associated with IBM®, Apple®, Sun® and Hewlett Packard® with alternate operating systems, such as DOS, UNIX®, LINUX, BEOS, MacOS™ and Solaris™. The present invention is equally applicable to portable computers, servers and multiprocessor computers.

The computer system S is comprised of a central processing unit ("CPU") 10 housing processing, memory, communications, interface, and other circuitry as described more fully below. CPU 10 is connectable to a monitor 12 for displaying graphical information to a user of the system. A keyboard 14 is also connectable to the CPU 10 for inputting data and for selecting desired functions, including rapid response to routine software requests. Additional input devices, such as a pointing device (e.g., mouse) 16 are coupled to CPU 10, providing additional input capabilities. These additional input devices could include the rapid response to routine software features of the present invention if such inclusion were consistent with providing rapid response from the user.

The components of computer system S are interconnected by data cables 18, which may be standard serial or parallel data transmission assemblies. Alternatively, one or more of the components of computer system S may be configured to transmit and receive data by means of infrared transceivers or various alternative data transmission techniques.

Figure 2:
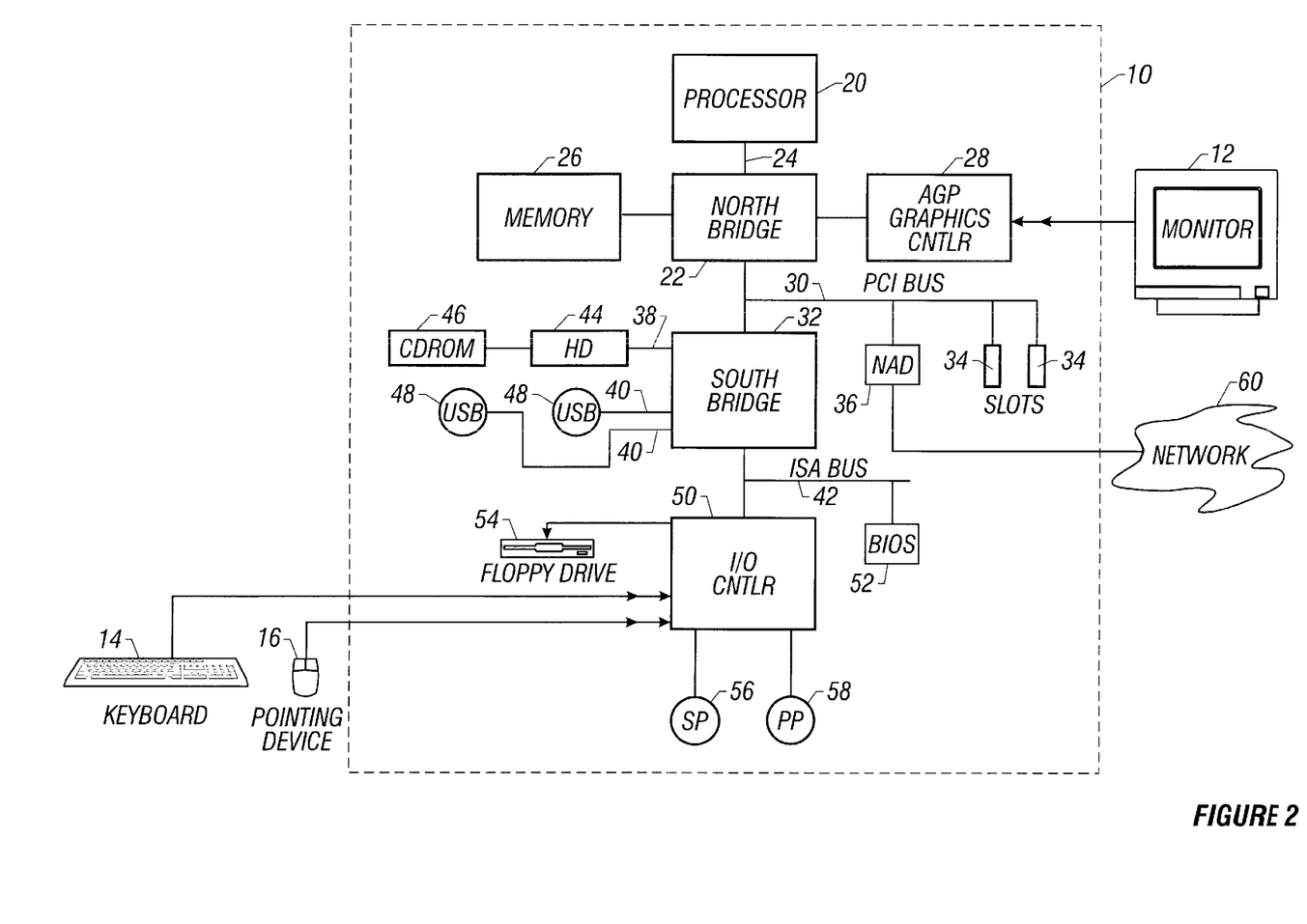
FIG. 2 is a block diagram of a computer system according to the preferred embodiment.

Turning now to FIG. 2, there is illustrated an exemplary block diagram of the circuitry of the computer system S. As is conventional in the art, the computer system S includes a processor 20, such as an Intel® Pentium® II microprocessor or the like. It is understood that alternate processors from Intel, AMD®, Cyrix®, Digital™ (Alpha®) and others may be used. The processor 20 is coupled to a north bridge 22 by a host or processor bus 24. The north bridge 22 includes a memory controller for coupling to an array of memory (e.g. dynamic random access memory "DRAM") 26, an Accelerated Graphics Port ("AGP") interface for coupling to an AGP graphics controller 28, and a Peripheral Component Interconnect ("PCI") interface for providing a PCI bus 30. The AGP graphics controller is further connectable to the monitor 12. In the computer system S, the PCI bus 30 couples the north bridge 22 to a south bridge 32 and one or more PCI slots 34 for receiving expansion cards (not shown). Further attached to the PCI bus 30 is a network access device ("NAD") 36, such as a network interface card or modem for connecting to a network.

The south bridge 32 is an integrated multifunctional component that includes a number of functions, such as, an enhanced direct memory access ("DMA") controller; interrupt controller; timer; integrated drive electronics ("IDE") controller for providing an IDE bus 38; a universal serial bus ("USB") host controller for providing a universal serial bus 40; and an industry standard architecture ("ISA") bus controller for providing an ISA bus 42. The IDE bus 38 supports up to four IDE devices, such as a hard disk drive 44 and a compact disk read only memory ("CD-ROM") 46. The universal serial bus 40 is connected to a pair of USB connectors 48 for communicating with USB devices (not shown). It is understood that alternatively, the keyboard 14 and pointing device 16 can connected to the universal serial bus USB 40 without detracting from the spirit of the invention.

In the illustrated computer system S, the ISA bus 42 couples the south bridge 32 to a multifunction input/output (I/O) controller 50 and a basic input/output system (BIOS) ROM 52. The multifunction I/O controller 50 typically includes a number of functions, such as a floppy disk drive controller for connecting to a floppy disk drive 54; a keyboard controller for connecting to the keyboard 14 and the pointing device 16; a serial communications controller for providing at least one serial port 56; and a parallel port interface for providing at least one parallel port 58. The functions described above may alternatively be implemented in separate integrated circuits or combined differently than described above without departing from the concept of the present invention.

Computer system S is also adapted for connection to a network, such as the internet, designated generally by reference number 60, through the network access device 36. Connection with the network may be made with various alternative a configurations, including, but not limited to, conventional telephone wire, integrated service digital network ("ISDN"), digital subscriber lines ("DSL"), and wireless communications.

FIGS. 3A, 3B, 4, and 5 illustrate an exemplary qwerty-style keyboard 14, and features of the keyboard for rapidly responding to routine software requests. As shown in FIG. 3, keyboard 14 is configured as a specially adapted, general purpose keyboard including a standard key array or matrix 60 for performing text editing functions and inputting data in a conventional manner. Function keys 62 are provided for executing predetermined functions based upon a particular software applications being run on the computer system.

Figure 3A:
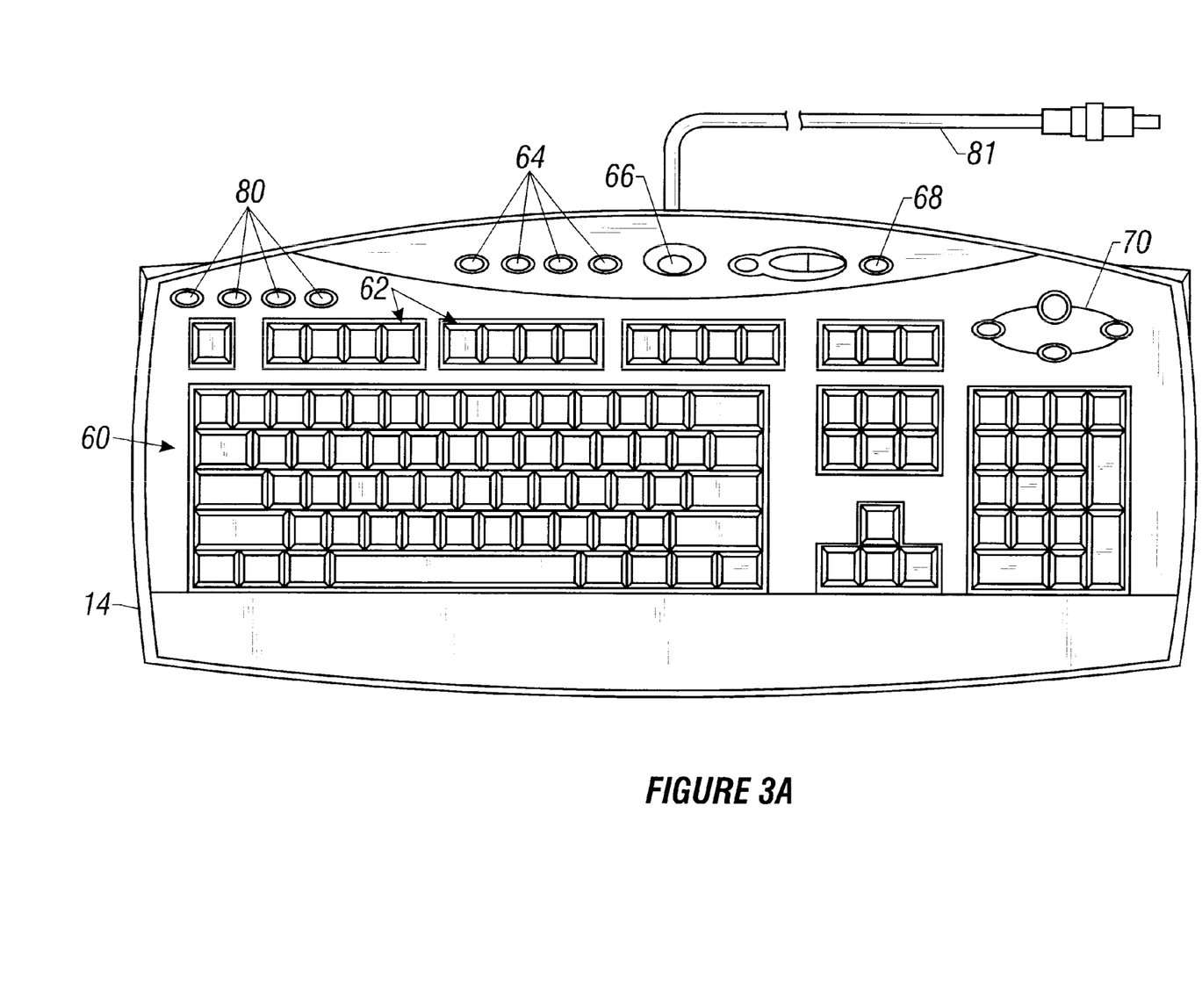
FIG. 3A is a top plan view of a keyboard as illustrated in FIG. 1 including dedicated keys for responding to routine software requests, according to the preferred embodiment.

In addition to standard keys, keyboard 14 includes a series of specialized keys for performing application launch and communication functions. In the illustrated embodiment a series of disk drive control keys 64 are provided. These keys preferably permit the user to command operations of a CD drive, such as for fast forwarding, reversing, searching, and so forth. Additional keys may be provided for supplementary functions, such as for adjusting the volume of speakers included in the computer system. A sleep mode key 66 is provided for placing the computer system in a low power consumption mode. At least one application launch key 68 is also provided. Actuation of this key causes a high-level interrupt for opening or launching a specific user-configurable software application, such as a text editing application. Such keys may also be provided for sending or receiving facsimiles, answering telephone calls, and so forth. A series of dedicated keys are also provided in a designated rapid internet access array 70. These keys permit the user to launch internet access application software, log on to the internet, and to navigate directly to specific internet sites without the need to navigate through a series of screen-based menus. These keys are more fully described in as described in copending U.S. patent application Ser. No. 09/093,246, entitled "Rapid Network Access Computer System," filed Jun. 8, 1998, and hereby incorporated by reference.

A second series of dedicated keys is provided in a designated rapid response access array 80. Conveniently, the rapid response array 80 is located near the escape (ESC) key of the keyboard 14, but alternatively the array 80 could be positioned near the spacebar or another easily accessible location. The keys of the rapid response array permit the user to rapidly provide a response to routine software requests typically requiring a pre-determined response, such as "yes, ", "no," or "cancel." If the keys were attached to a pointing device, such as a mouse, the keys could be positioned on the side of the pointing device or similar location where finger access is convinient. Finally, keyboard 14 includes a cable assembly 81 for providing data transfer to the computer console.

Figure 3B:
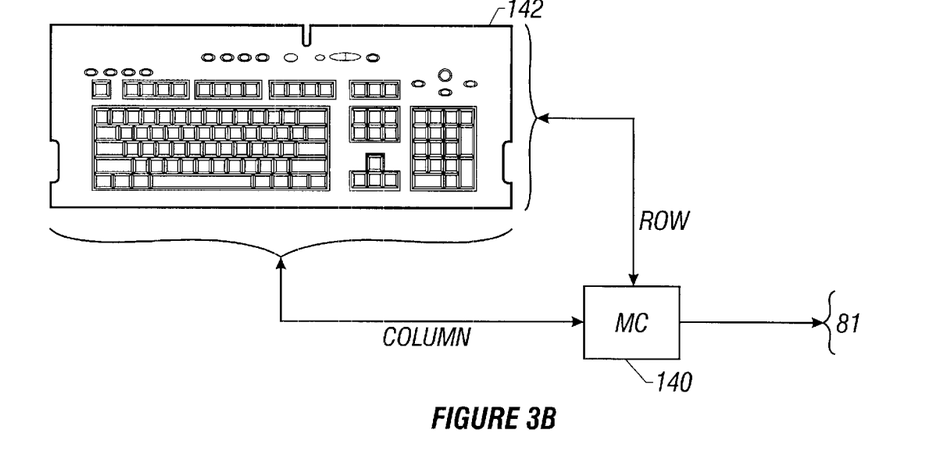
FIG. 3B is an exemplary block diagram of circuitry of the keyboard of FIG. 3A.

Now referring to FIG. 3B, there is illustrated an exemplary block diagram of the circuitry of the keyboard 14. A keyboard processor 140, such as an Intel 8051 class microcontroller, includes ports for reading and writing which are coupled to a row/column matrix of key switches 142. The operation of the keyboard processor 140 includes the steps of scanning the matrix 142 of rows and columns one row at a time for an actuated key. If one of the particular elements in a particular driven column is switched or actuated, a connection is completed and sensed on a scanned row by the keyboard processor 140, as is well known to those of ordinary skill in the art. A scan code is generated from the row/column combination. The keys of the rapid response array are assigned a unique scan code for transmission over the data cable 81 to the computer system S.

Figure 4:
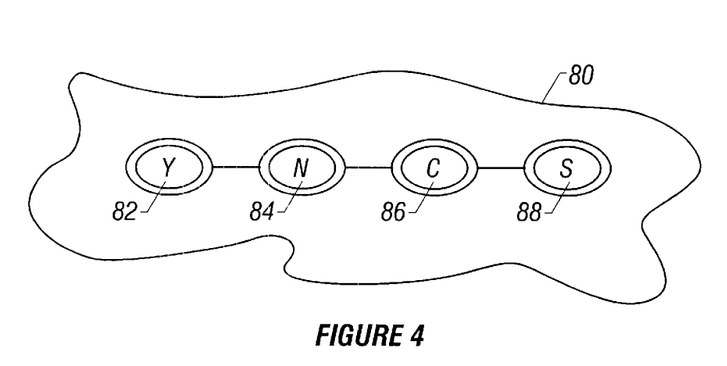
FIG. 4 is a detail view of the dedicated keys of the keyboard of FIG. 2, according to the preferred embodiment.

FIG. 4 illustrates the keys provided in rapid response array 80 in somewhat greater detail. In particular, three keys permit the user to respond rapidly to routine software requests typically requiring a "yes,", "no," or "cancel" response. Additionally, rapid input for routine commands, such as "save" or "close and save" are provided with a fourth key.

As shown in FIG. 4, each of the dedicated and unique keys carries indicia in the form of a molded or printed letter or icon, indicating the function of each key. The relative positioning of the keys may be changed without detracting from the spirit of the invention. A "yes" response corresponds with a key 82; a "no" response corresponds with a key 84; a "cancel" response corresponds with a key 86; and a "close and save" response corresponds with a key 88. The unique rapid response keys are additional keys in comparison to the matrix of general-purpose keys found on a typical keyboard. They are special keys dedicated to the single purpose responding to a software request according to their assigned function. The unique rapid response keys are preferrably not re-programmable since the functions are useful in most software applications and operating sytems.

Figure 5:
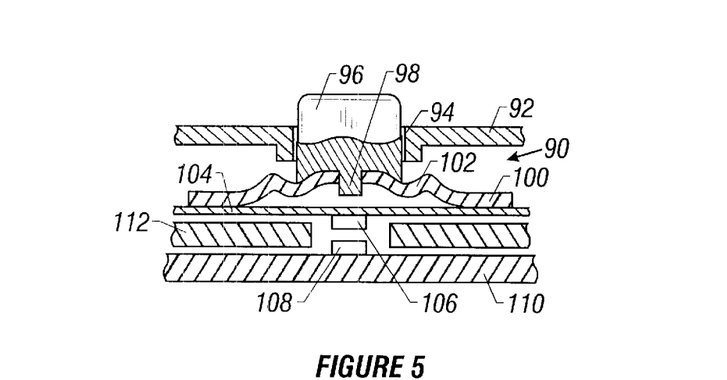
FIG. 5 is a sectional view through an exemplary key and switch arrangement for the dedicated keys of the keyboard of FIG. 3, according to the preferred embodiment.

As illustrated in FIG. 5, in the present embodiment rapid response keys 82, 84, 86, and 88 are depressed by the user to force contact of a membrane switch 90. The primary components of such a switch are illustrated in FIG. 5. Accordingly, the membrane switch 90 is formed below an upper panel 92 of the keyboard 14. An aperture 94 is formed at each location in the keyboard corresponding to the location of a key 96. Along a lower region, each key includes a protrusion 98, which extends through a resilient panel 100. Panel 100 forms a biasing region 102 below each key 96 to bias the key into an upward position. A membrane 104 is positioned below resilient panel 100, and carries a plurality of contacts 106. Each contact 106 is coupled to a conductor in a conductor grid for transmitting signals to an encoding circuit (see FIG. 2). A lower contact 108 is positioned in mutually facing relation to contact 106. Contact 108 may rest on a base plate 110. Like contact 106, contact 108 is coupled to a conductor (not shown) in a grid for transmitting signals to an encoding circuit upon closure of the switch. An insulated separator 112 is positioned between membrane 104 and plate 110. Upon depression of key 96, protrusion 98 forces contact 106 downwardly toward contact 108, thereby completing a conductive path through the switch 90.

Alternative switches may be foreseen in the keyboard 14 for executing the rapid response functions described herein. Such switches may include, for example, capacitive switches. Moreover, it should be noted that the rapid response functions executed in response to actuation or closure of switches 82, 84, 86, and 88 may be accomplished through actuation of a combination of switches on the keyboard. For example, one or more function keys 70 may be designated to execute internet access in combination with other keys, such as keys comprising array 68. Alternatively, a rapid response key may be provided as a special function key, and configured to operate in connection with secondary keys on the keyboard, such as keys of array 68. A user may then accomplish providing a routine response to software requests and so forth upon depression of the specialized function key and one or more additional keys.

Figure 6:
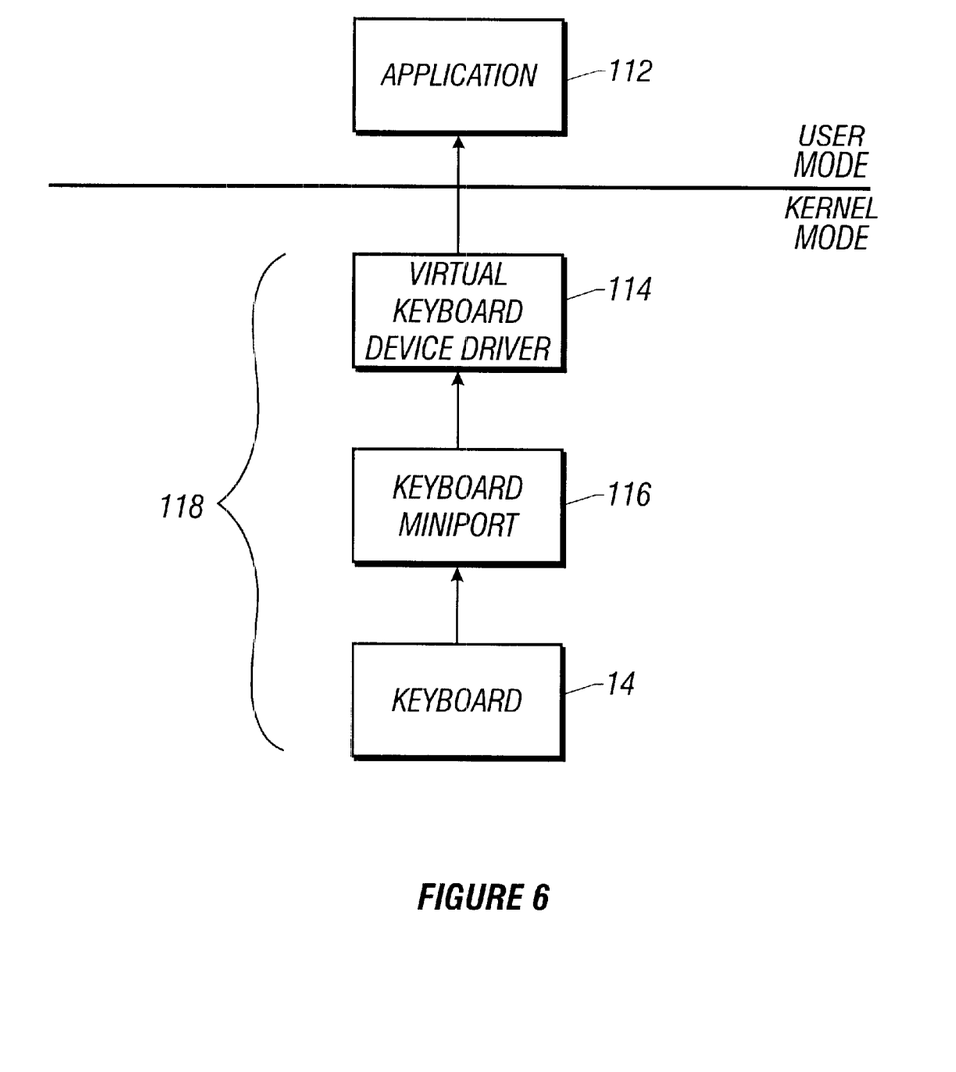
FIG. 6 is a block diagram illustrating software device driver architectures operable on the computer system of FIG. 1 for responding to routine software requests according to the preferred embodiment.

Turning now to FIG. 6, there is illustrated a software architecture for rapidly responding to routine software requests, according to the preferred embodiment. The preferred operating system is Microsoft® Windows™ 95/98/NT. However, one of ordinary skill in the art will be able to apply the principles disclosed herein to alternate versions of Windows and other operating systems, such as UNIX™, LINUX, BEOS, MacOS™ and Solaris™, etc., (hereinafter collectively "operating system"). The operating system is shown having a user mode and kernel mode. An application 112 runs in user mode and communicates with a keyboard system 118. In general, the keyboard system 118 is comprised of a hardware portion and a software portion. A virtual keyboard device driver 114 and a keyboard miniport driver 116 run in kernel mode and form the software portion. The hardware portion is the electro-mechanical hardware device 14 of FIG. 1, which is capable of receiving user input.

Conventionally, when data is received from the keyboard 14 by the interface circuitry, an interrupt is issued to the processor 20 by the interface circuitry causing a keyboard device driver to read the data from registers (port 60h) of the interface circuitry (8042-style keyboard controller). The device driver basically provides hardware-independent keyboard input to the application 112 by translating scan codes to virtual-key codes.

According to the preferred embodiment, the keyboard device driver is partitioned into the virtual keyboard device driver 114 and the keyboard miniport driver 115. Miniport drivers are a class of device drivers for extending standard device drivers. A miniport driver is a hardware-specific driver that uses an operating-system-provided class driver to accomplish most actions through function calls, and provides only device-specific controls. Thus, the miniport driver 116 is tasked with knowing the special features of the keyboard 14, such as the rapid response array 80 so they can be utilized by the operating system and/or applications.

The keyboard 14 is connectable to the computer system S typically via a PS/2 port (not shown), the serial port 56, or the universal serial bus 40. Generally, interface circuitry (not shown) in the I/O controller 50 is responsible for managing the signaling protocols between the computer system S and the keyboard 14.

Figure 8:
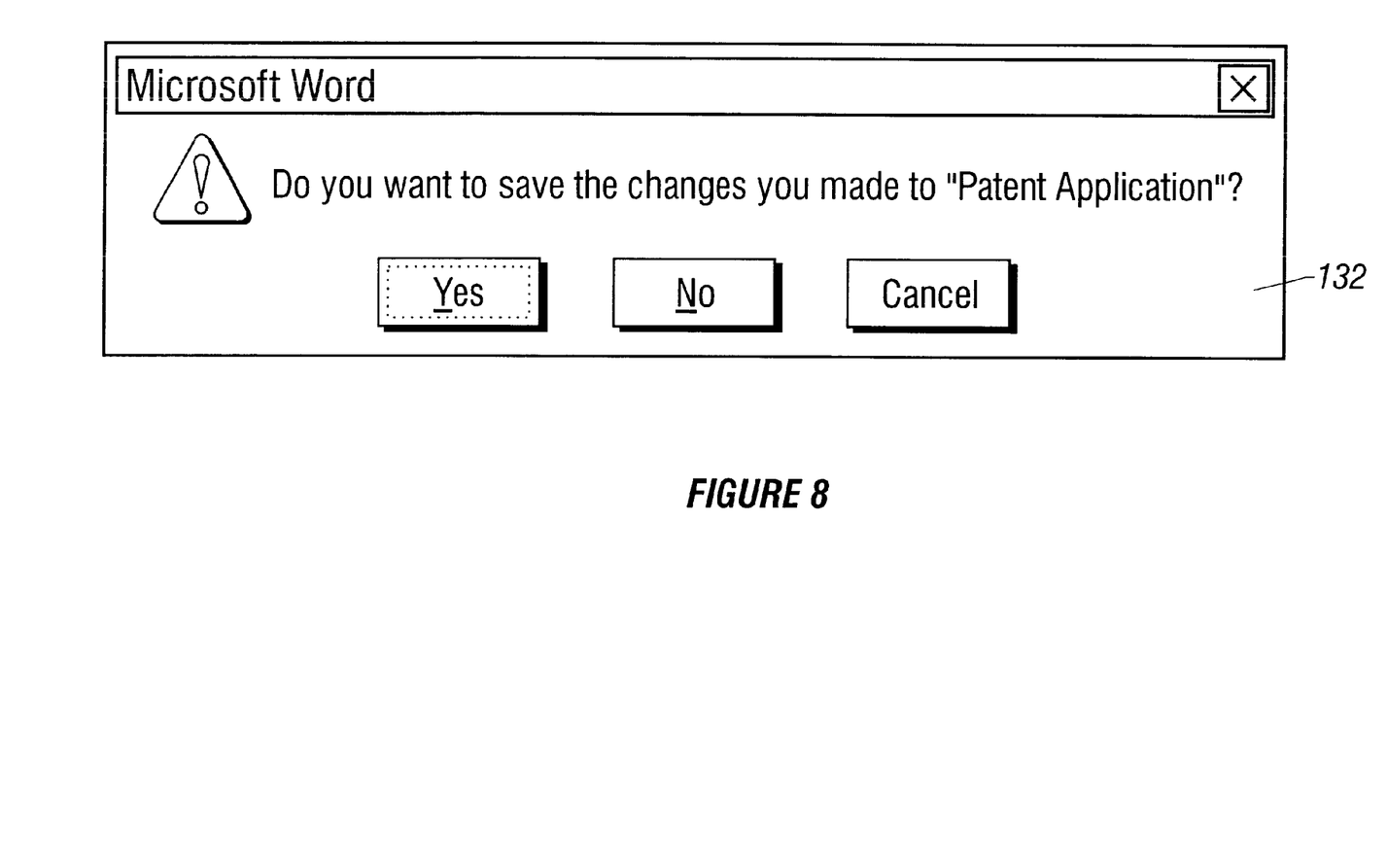
FIG. 8 is diagram illustrating a dialog box shown soliciting a routine response from a user.

Once the keyboard data is read from the interface circuitry by the keyboard miniport driver 116, the miniport driver 116 filters the data to check for actuation of one of the special keys 82, 84, 86 and 88. If actuated, the miniport driver 116 then modifies the data according to the special keys before providing the keyboard data to the virtual keyboard device driver 114. For example, if the "yes" key is pressed, the miniport driver 116 receives the scan code, translates the scan code into the "yes" response and makes a function call to the virtual keyboard device driver 114 for passing the response onto the application as though the "virtual" screen button has been pressed with the pointing device. In the case of the "close-and-save" key, a "save" command is issued to the application followed by a "close file" command, thereby preventing the typical request presented to a user when closing a file that asks: Do you want to save file? Yes, No, Cancel—as shown in FIG. 8.

The keyboard miniport driver 116 is operable to monitor keyboard input to determine when any of the special keyboard keys, such as the dedicated keys 82, 84, 86 and 88 or others are actuated.

It is understood that while the preferred embodiment utilizes a miniport driver architecture, other architectures are equally acceptable, such as modifying the virtual keyboard device driver 114.

Figure 7:
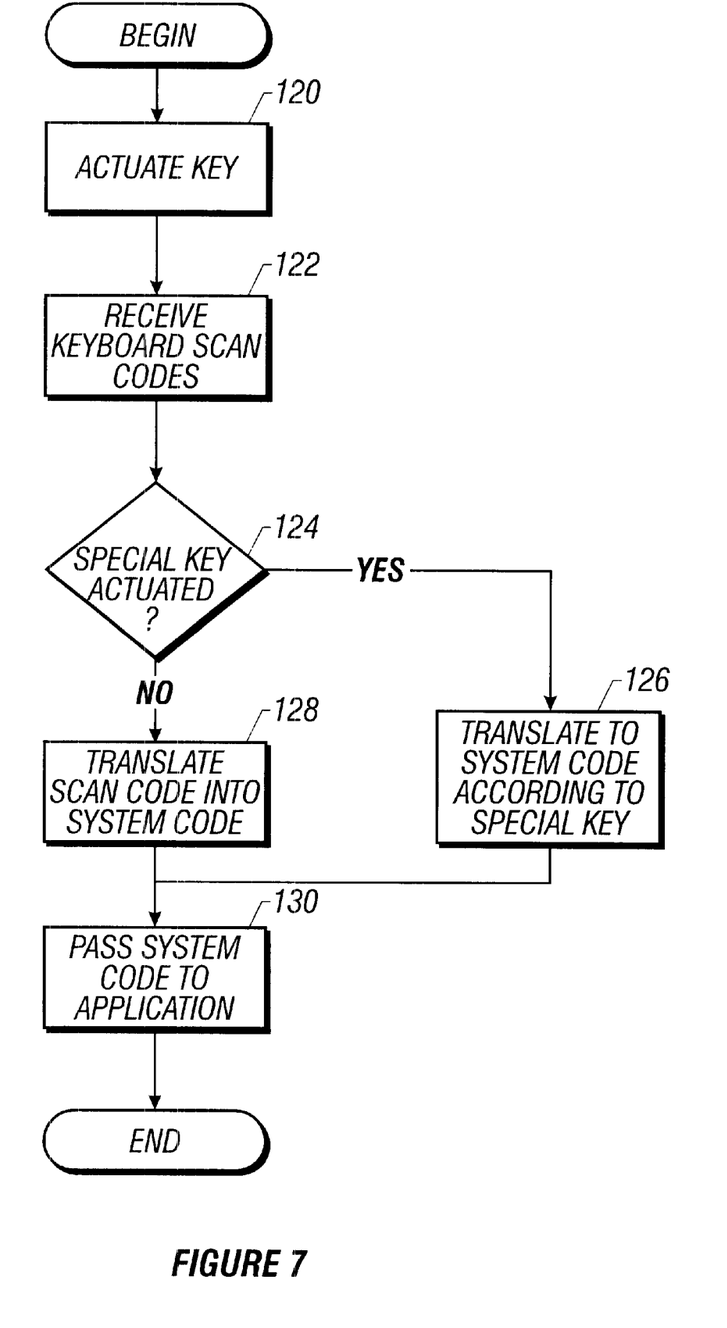
FIG. 7 is a flow chart illustrating a method of responding to routine software requests operable by the software device driver architecture of FIG. 5, according to the preferred embodiment.

Now referring to FIG. 7, there is illustrated a flow diagram of the steps involved in providing a rapid response to routine software requests. The process begins at step 120 when one of the special keys 82, 84, 86 or 88 are actuated in response to a request from software such as the dialog box 132 illustrated in FIG. 8. This causes, at step 122, a keyboard scan code to be provided by the keyboard 14 to the input/output controller 50, which generates an interrupt. In response to the interrupt, the miniport device driver 116 reads the keyboard data and, at step 124, determines whether one of the special keys 82, 84, 86 or 88 has been actuated. If so, the miniport driver 116 at step 126 translates the scan code into a function call to the virtual keyboard device driver 114 for passing the response to the application 112. If one of the special keys has not been actuated, at step 128 the key is passed to the virtual keyboard device driver 114 for translation into a system code. At step 130, the virtual keyboard device driver 114 provides to the application 112 the response according to keys 82, 84, 86 or 88, or a system code.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims. For example, while in the foregoing description reference has been made to a general purpose keyboard having dedicated keys for rapid response to routine software requests of the computer system S, various alternative forms of input devices may be envisaged. Such keys may be provided in a mouse or similar peripheral input device if useful to the user to provide a rapid response with minimal effort. Similarly, keys for performing these functions may be provided in a remote input device, such as a hand-held radio frequency or infrared device or keyboard. Accordingly, it should be clearly understood that the form of the invention described herein is exemplary only and is not intended as a limitation on the scope of the invention.

What is claimed is:

1. A input device for a computer system, comprising:
    a housing;
    one or more general-purpose keys coupled to the housing; and
    a plurality of user non-programmable rapid response keys including a combined CLOSE-AND-SAVE function key coupled to the housing, each rapid response key corresponding to specific user feedback in response to a query from software, each rapid response key providing a unique signal when activated, said combined CLOSE-AND-SAVE function key operable to cause a software application operating on the computer system both to save a file and to close the file.

2. The input device of claim 1, further comprising:
    a driver for operation on the computer system, said driver responsive to the unique signal to communicate the specific user feedback to the software application.

3. The input device of claim 1, wherein another one of said user non-programmable rapid response keys corresponds to a YES response.

4. The input device of claim 1, wherein another one of said user non-programmable rapid response keys corresponds to a NO response.

5. The input device of claim. 1, wherein another one of said user non-programmable rapid response keys corresponds to a CANCEL response.

6. The input device of claim 1, wherein the input device is a keyboard.

7. The input device of claim 6,
wherein said one or more general-purpose keys includes a matrix of keys, and
wherein said rapid response keys are arranged near the matrix of keys.

8. A computer system, comprising:
a processor for executing a software application;
an input/output controller coupled to said processor;
a input device connectable to said input/output controller, comprising:
one or more general-purpose keys;and
a plurality of user non-programmable rapid response keys including a combined CLOSE-AND-SAVE function key, each rapid response key corresponding to a predetermined answer in response to a query from the software application, each rapid response key providing a unique signal when activated,
wherein when said combined CLOSE-AND-SAVE function key is actuated, the software application causes the processor both to save a file and to close the file.

9. The computer system of claim 8, further comprising:
a driver for execution by the processor, said driver responsive to the unique signal to communicate the predetermined answer to the software application.

10. The computer system of claim 8, wherein another one of said user non-programmable rapid response keys corresponds to a YES response.

11. The computer system of claim 8, wherein another one of said user non-programmable rapid response keys corresponds to a NO response.

12. The computer system of claim 8, wherein another one of said user non-programmable rapid response keys corresponds to a CANCEL response.

13. The input device of claim 8, wherein the input device is a keyboard.

14. The input device of claim 13, wherein said one or more general-purpose keys includes a matrix of keys, and
wherein said user non-programmable rapid response keys are arranged at a location near the matrix of keys.

15. The computer system of claim 8, wherein the software application is an application running under a Microsoft Windows operating system.

16. The computer system of claim 8, wherein the input device is a keyboard.

17. The computer system of claim 8, wherein the query from software is presented in the form of a dialog box on a monitor.

18. The computer system of claim 9, further including a hard disk drive for storing the driver and software application.

19. A method for rapidly responding to routine software requests, the method comprising:
actuating one of a plurality of user non-programmable rapid response key on a keyboard;
translating the actuation into a scan code;
providing the scan code to a central processing unit;
the central processing unit determining whether the scan code is a unique rapid rapid response key, including a combined function CLOSE-AND-SAVE key;
translating the scan code into a pre-determined response understandable by the software;
communicating the pre-determined response to the software; and
the software both saving a file and closing the file, if the pre-determined response corresponds to the combined function CLOSE-AND-SAVE key.

20. The method of claim 19, further comprising:
before said actuating step, presenting a software request to a user in the form of a graphical dialog box on a monitor.

21. The method of claim 20, further comprising:
closing the dialog box in response to the software receiving the response.

22. The method of claim 20, wherein another one of said user non-programmable rapid response keys corresponds to a YES response.

23. The method of claim 20, wherein another one of said user non-programmable rapid response keys corresponds to a NO response.

24. The method of claim 20, wherein another one of said user non-programmable rapid response keys corresponds to a CANCEL response.

25. A keyboard for a computer system, comprising:
a housing;
a matrix of general-purpose keys; and
a plurality of user non-programmable rapid response keys including a dual function CLOSE-AND-SAVE key, each rapid response key corresponding to a predetermined answer in response to a query from a software application, each rapid response key providing a unique signal when activated, said dual function CLOSE-AND-SAVE key operable to cause the software application operating on the computer system both to save a file and to close the file.

26. The keyboard of claim 25, further comprising:
a driver for operation on the computer system, said driver responsive in the unique signal to communicate the predetermined answer to the software application.

27. The keyboard of claim 25, wherein another one of said user non-programmable rapid response keys corresponds to a YES response.

28. The keyboard of claim 25, wherein another one of said user non-programmable rapid response keys corresponds to a NO response.

29. The keyboard of claim 25, wherein another one of said user non-programmable rapid response keys corresponds to a CANCEL response.

30. The keyboard of claim 25, wherein one of said matrix of general purpose keys includes an escape key, and wherein said user non-programmable rapid response keys are positioned above the escape key.

31. The keyboard of claim 25, wherein one of said matrix of general purpose keys includes a space bar, and wherein said user non-programmable rapid response keys are positioned below the space bar.

32. An input device for a computer system operating a software application, the input device comprising:
a housing;
one or more general-purpose keys; and
a plurality of user non-programmable rapid response keys, one of the rapid response keys being a dual function CLOSE-AND-SAVE key, each rapid response key corresponding to a predetermined message for the software application,
each user non-programmable rapid response key having a means for providing a unique signal when that rapid response key is activated; and means for providing an interrupt in response to receipt of the unique signal;

means for reading the unique signal from the interrupt means and converting the unique signal into a message acceptable by the software application for passage to the software application, the message being a user response to a routine software request; and wherein receipt of the CLOSE-AND-SAVE message by the software application causes the software application both to save a file and to close the file.

33. The input device of claim 32, wherein another one of said user non-programmable rapid response keys corresponds to a YES response.

34. The input device of claim 32, wherein another one of said user non-programmable rapid response keys corresponds to a NO response.

35. The input device of claim 32, wherein another one of said user non-programmable rapid response keys corresponds to a CANCEL response.

36. The input device of claim 32, wherein the routine software request from the software application is presented to the user in the form of a dialog box on a monitor requesting the user to provide a YES, NO or CANCEL response, and wherein actuation of one of the rapid response keys provides a message corresponding to a YES, NO or CANCEL response, and wherein the routine software request is satisfied and the dialog box is closed by the software application upon receipt of the message.

* * * * *